(12) United States Patent
Nakano et al.

(10) Patent No.: US 11,485,202 B2
(45) Date of Patent: Nov. 1, 2022

(54) DOOR MODULE AND DOOR MODULE FIXTURE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Haruka Nakano, Mie (JP); Motohiro Yokoi, Mie (JP); Shigeki Ikeda, Mie (JP); Kenta Ito, Mie (JP); Daisuke Ebata, Mie (JP); Yuya Fukami, Mie (JP); Masaki Mizushita, Mie (JP); Tetsuya Nishimura, Mie (JP); Ryuta Takakura, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES. LTD., Osaka (JP)

( * ) Notice: Subject to any disclaimer, the term of this patent is extended or adjusted under 35 U.S.C. 154(b) by 346 days.

(21) Appl. No.: 16/765,333

(22) PCT Filed: Sep. 25, 2018

(86) PCT No.: PCT/JP2018/035507
§ 371 (c)(1),
(2) Date: May 19, 2020

(87) PCT Pub. No.: WO2019/111499
PCT Pub. Date: Jun. 13, 2019

(65) Prior Publication Data
US 2020/0353800 A1    Nov. 12, 2020

(30) Foreign Application Priority Data
Dec. 6, 2017  (JP) ............................. JP2017-234017

(51) Int. Cl.
*B60J 5/04*    (2006.01)
*B60J 10/86*   (2016.01)
(Continued)

(52) U.S. Cl.
CPC ........... *B60J 5/0413* (2013.01); *B60J 5/0416* (2013.01); *B60J 5/0468* (2013.01); *B60J 10/86* (2016.02);
(Continued)

(58) Field of Classification Search
CPC ....... B60J 5/0413; B60J 5/0468; B60J 5/0416
(Continued)

(56) References Cited

U.S. PATENT DOCUMENTS 2,255,725 A * 9/1941 Trescher .................. B60J 10/70
                                                    160/354
3,092,877 A * 6/1963 Perilstein .............. E06B 3/6205
                                                    52/204.595
(Continued)

FOREIGN PATENT DOCUMENTS

| EP | 1 544 045 | 6/2005 |
| EP | 1 555 162 | 7/2005 |

(Continued)

OTHER PUBLICATIONS

Indian Official Action received in Indian Application No. 202017022597, dated Feb. 24, 2021.
(Continued)

*Primary Examiner* — Dennis H Pedder
(74) *Attorney, Agent, or Firm* — Greenblum & Bernstein, P.L.C.

(57) ABSTRACT

On an outer circumferential edge of a closing plate, an elastic fitting portion protruding to an outer side of an inner circumferential edge of a service hole and fitting with the inner circumferential edge projects with a thickness larger
(Continued)

than the plate thickness of the closing plate and extends in the circumferential direction of the outer circumferential edge. The elastic fitting portion is provided with an inner circumferential edge accommodating recessed groove that opens in the center of a protruding end surface of the elastic fitting portion and extends in the circumferential direction to accommodate the inner circumferential edge of the service hole, and the inner circumferential edge of the service hole is clamped between a pair of elastic clamping pieces that face each other with the inner circumferential edge accommodating recessed groove interposed between the pair of elastic clamping pieces.

5 Claims, 5 Drawing Sheets

(51) Int. Cl.
  *B60R 16/02* (2006.01)
  *F16B 5/00* (2006.01)
  *H01B 7/00* (2006.01)
(52) U.S. Cl.
  CPC .......... *B60R 16/0207* (2013.01); *F16B 5/004* (2013.01); *H01B 7/0045* (2013.01)

(58) Field of Classification Search
  USPC ............... 296/146.1, 146.5, 146.8, 152, 154; 49/501, 502
  See application file for complete search history.

(56) References Cited

U.S. PATENT DOCUMENTS

| | | | |
|---|---|---|---|
| 2005/0148213 A1 | 7/2005 | Takase et al. | |
| 2005/0150678 A1 | 7/2005 | Takase et al. | |

FOREIGN PATENT DOCUMENTS

| | | | |
|---|---|---|---|
| GB | 2 164 609 | | 3/1986 |
| JP | 2004-262306 | A | 9/2004 |
| JP | 2005-178616 | A | 7/2005 |
| JP | 2005-199812 | A | 7/2005 |
| JP | 3756698 | B2 * | 3/2006 |
| JP | 2013-203296 | A | 10/2013 |
| JP | 2014-144727 | A | 8/2014 |

OTHER PUBLICATIONS

International Search Report issued in International Bureau of WIPO Patent Application No. PCT/JP2018/035507, dated Oct. 30, 2018.

* cited by examiner

DOOR MODULE AND DOOR MODULE FIXTURE

TECHNICAL FIELD

The present invention relates to a door module in which a door harness is routed in advance on a closing plate made of resin for closing a service hole provided in a door inner panel of an automobile, and a door module fixture used for fixing the door module to the door inner panel.

BACKGROUND ART

Conventionally, door electrical components such as a speaker, and a door harness that is a wire harness connected to the door electrical components are routed between a door outer panel and a door inner panel of an automobile, and a service hole for maintenance is left open in the door inner panel. The service hole is covered with a waterproof vinyl sheet or the like in order to prevent water from entering into the door inner panel from the service hole.

In recent years, as described in JP 2005-178616, for example, it has been proposed to use a door module that employs a relatively hard resin closing plate with shape retention, in place of a waterproof vinyl sheet covering the service hole, and that is modularized by attaching a door harness and door electrical components and the like to be connected to the door harness to the closing plate. By using such a door module, the work of arranging a door harness and the like at the time of assembling a vehicle can be simplified, and the workability can be improved.

However, even when such a door module is used, it is necessary to fix the door module to the door inner panel by bolting. Accordingly, in a relatively large door module, the work of aligning the bolt holes provided at a plurality of positions with the bolt holes on the door inner panel side becomes complicated. Also, in order to automate such a bolting work, various devices such as a bolt filling mechanism and a bolt fastening mechanism are required, and it may be difficult to secure a sufficient working space.

CITATION LIST

Patent Documents

Patent Document 1: JP 2005-178616A

SUMMARY OF INVENTION

Technical Problem

The present invention has been made in view of shove circumstances, and it is an object of the present invention to provide a door module and a door module fixture having a novel structure that can easily attach the door module to a door inner panel.

Solution to Problem

A first aspect of the present invention concerning a door module is a door module in which a door harness is routed in advance on a closing plate made of resin for closing a service hole provided in a door inner panel of an automobile, wherein the closing plate is formed in such a size that its outer circumferential edge faces an inner circumferential edge of the service hole across a gap, on the outer circumferential edge of the closing plate, an elastic fitting portion protruding to the outer side of the inner circumferential edge of the service hole and fitting with the inner circumferential edge projects with a thickness larger than the thickness of the closing plate and extends in the circumferential direction of the outer circumferential edge, the elastic fitting portion is provided with an inner circumferential edge accommodating recessed groove that opens in the center of the protruding end surface of the elastic fitting portion and extends in the circumferential direction to accommodate the inner circumferential edge of the service hole, and the inner circumferential edge of the service hole is clamped between a pair of elastic clamping pieces that face each other with the inner circumferential edge accommodating recessed groove interposed between the pair of elastic clamping pieces.

According to this aspect, the closing plate is formed in such a size that its outer circumferential edge faces the inner circumferential edge of the service hole across a gap, and on the outer circumferential edge of the closing plate, the elastic fitting portion protruding to the outer side of the inner circumferential edge of the service hole and fitting with the inner circumferential edge projects with a thickness larger than the thickness of the closing plate, extending in the circumferential direction of the outer circumferential edge. Furthermore, the elastic fitting portion is provided with the inner circumferential edge accommodating recessed groove that opens in the center of the protruding end surface of the elastic fitting portion and extends in the circumferential direction, and a pair of elastic clamping pieces are provided to face each other with the inner circumferential edge accommodating recessed groove interposed between the pair of elastic clamping pieces. Accordingly, by placing the door module of the present invention on the service hole of the door inner panel and applying a pressing force, of the pair of elastic clamping pieces of the elastic fitting portion projectingly provided on the outer circumferential edge of the closing plate, the elastic clamping piece closest to the inner circumferential edge of the service hole is elastically deformed toward the recessed groove, and elastically returns when passing over the inner circumferential edge of the service hole. Accordingly, the inner circumferential edge of the service hole is clamped by the pair of elastic clamping pieces, and the door module is fitted to the inner circumferential edge of the service hole of the door inner panel via the elastic fitting portion. As a result, the door module is held by the door inner panel.

Therefore, according to the door module of this aspect, the conventionally required work of bolting the door module to the door inner panel can be omitted, and a large device required for bolting can be eliminated. As a result, the door module can be easily attached to the door inner panel, and the attachment process can be further advantageously automated.

Moreover, because the door module is fixed to the door inner panel by clamping the inner circumferential edge of the service hole between the pair of elastic clamping pieces, it is possible to eliminate the contact surface between the door module and the door inner panel. Therefore, in the structure in which a door module is directly superimposed on the door inner panel and bolted as in the conventional structure, rubber packing sandwiched between them can be eliminated, and the number of the parts can be reduced.

Note, that the elastic fitting portion may also be provided over the entire circumference of the outer circumferential edge of the closing plate, or may also be provided at a plurality of positions spaced apart in the circumferential direction, and may be appropriately set in accordance with the required waterproof property and vibration damping characteristics. Also, the elastic fitting portion may also be provided integrally with the closing plate, or may also be provided separately from the closing plate and fixed to the closing plate on the base end side.

According to a second aspect of the present invention concerning a door module, in the door module according to the first aspect, the elastic fitting portion may be provided at a plurality of locations spaced apart in the circumferential direction of the outer circumferential edge of the closing plate.

According to this aspect, because the elastic fitting portions are divided and provided at a plurality of locations spaced apart in the circumferential direction of the closing plate, the pressing three applied when the door module is placed on the service hole and pushed into the service hole can be reduced. As a result, the ease of attachment can be improved. The setting locations of the elastic fitting portions can be set to include, for example, the locations in which bolting and fixing are conventionally required.

According to a third aspect of the present invention concerning a door module, in the door module according to the first or second aspect, the elastic fitting portion may be formed of a rubber elastic body.

According to this aspect, because the elastic fitting portion is formed of a rubber elastic body, the door module can be fixed to the door inner panel while ensuring high vibration damping characteristics. Also, a large amount of elastic deformation of the pair of elastic clamping pieces can be ensured, and the clamping force of the pair of elastic clamping pieces can be advantageously obtained.

According to a fourth aspect of the present invention concerning a door module, in the door module according to any one of the first to third aspects, the elastic fitting portion may be formed separately from the closing plate and provided with an outer circumferential edge accommodating recessed groove that opens in the center of a base end surface of the elastic fitting portion and extends in the circumferential direction to accommodate the outer circumferential edge of the closing plate, and the outer circumferential edge of the closing plate is held between a pair of holding pieces that face each other with the outer circumferential edge accommodating recessed groove interposed between the pair of holding pieces.

According to this aspect, because the elastic fitting portion is formed separately from the closing plate, the elastic fitting portion can be easily manufactured. Moreover, the elastic fitting portion can be attached to the closing plate by simply fitting the outer circumferential edge of the closing plate to the outer circumferential edge accommodating recessed groove that opens in the base end surface of the elastic fitting portion and holding the elastic fitting portion between the pair of the holding pieces. Accordingly; the elastic fitting portion can be easily set to the closing plate.

Note, that the pair of holding pieces may also be brought into pressure contact with the outer circumferential edge of the closing plate by elastic return force, or may also be abutted without being pressed against the outer circumferential edge of the closing plate and fixed with an adhesive or the like.

According to a fifth aspect of the present invention concerning a door module, in the door module according to the fourth aspect, the closing plate may be used in a plurality of vehicle types, a plurality of types of the elastic fitting portions may be prepared, each of which has a different protruding dimension according to a facing gap size between the outer circumferential edge of the closing plate and the inner circumferential edge of the service hole, which differs for each of the plurality of vehicle types, and the elastic fitting portion corresponding to the vehicle type may be selected and attached to the closing plate.

According to this aspect, because the elastic fitting portion is formed separately from the closing plate, even if there is a difference in the size or the like of the service hole for each vehicle type, it is possible to cope with the difference for each vehicle type, by using the same size of closing plate and preparing the plural types of elastic fitting portions by making the protrusion dimensions of the elastic fitting portions different according to the difference in a facing gap size between the outer circumferential edge of the closing plate and the inner circumferential edge of the service hole, which differs for each of the plurality of vehicle types. This makes it possible to use the same size of closing plate, and to improve the versatility of the door module according to the present invention.

A first aspect of the present invention concerning a door module fixture is a doer module fixture used for fixing a door module in which a door harness is routed in advance on a closing plate made of resin for closing a service hole provided in a door inner panel of an automobile to the door inner panel, wherein the door module fixture is constituted by the elastic fitting portion of the door module according to the fourth or fifth aspect.

According to this aspect, a door module fixture can be provided using the elastic fitting portion that is formed separately from the closing plate of the door module according to the fourth or fifth aspect. Accordingly, the elastic fitting portion can be attached to the closing plate by simply fitting the outer circumferential edge of the closing plate to the outer circumferential edge accommodating recessed groove that opens in the base end surface of the elastic fitting portion and holding the elastic fitting portion between the pair of the holding pieces. Accordingly, the elastic fitting portion can be easily set to the closing plate.

Also, the door module fixture can be provided with a plurality of variations by making the protrusion dimensions different according to the difference in the face gap size between the outer circumferential edge of the closing plate and the inner circumferential edge of the service hole, which differs for each vehicle type. Therefore, a general-purpose door module fixture can be provided.

Advantageous Effects of Invention

According to the present invention, on the outer circumferential edge of the closing plate, the elastic fitting portion fitting with the inner circumferential edge of the service hole projects with a thickness larger than the thickness of the closing plate, and extends in the circumferential direction of the outer circumferential edge. Further, the elastic fitting portion is provided with the inner circumferential edge accommodating recessed groove, and a pair of elastic clamping pieces are provided to face each other with the inner circumferential edge accommodating recessed groove interposed between the pair of elastic clamping pieces. Accordingly, by simply placing the door module of the present invention on the service hole of the door inner panel and applying a pressing force, the inner circumferential edge of the service hole is clamped between the pair elastic clamping pieces, and the door module is held by the door inner panel. Accordingly, because the conventionally required work of bolting the door module on the door inner panel can be omitted, the door module can be easily attached to the door inner panel, and the attachment process can be further advantageously automated. Moreover, because the door module is fixed to the door inner panel by clamping the inner circumferential edge of the service hole between the pair of elastic clamping pieces, it is possible to eliminate the contact surface between the door module and the door inner panel. Therefore, the conventionally required rubber packing can be eliminated, and the number of components can be reduced.

DESCRIPTION OF EMBODIMENTS

Hereinafter, embodiments of the present invention will be described with reference to the drawings.

Figure 1:
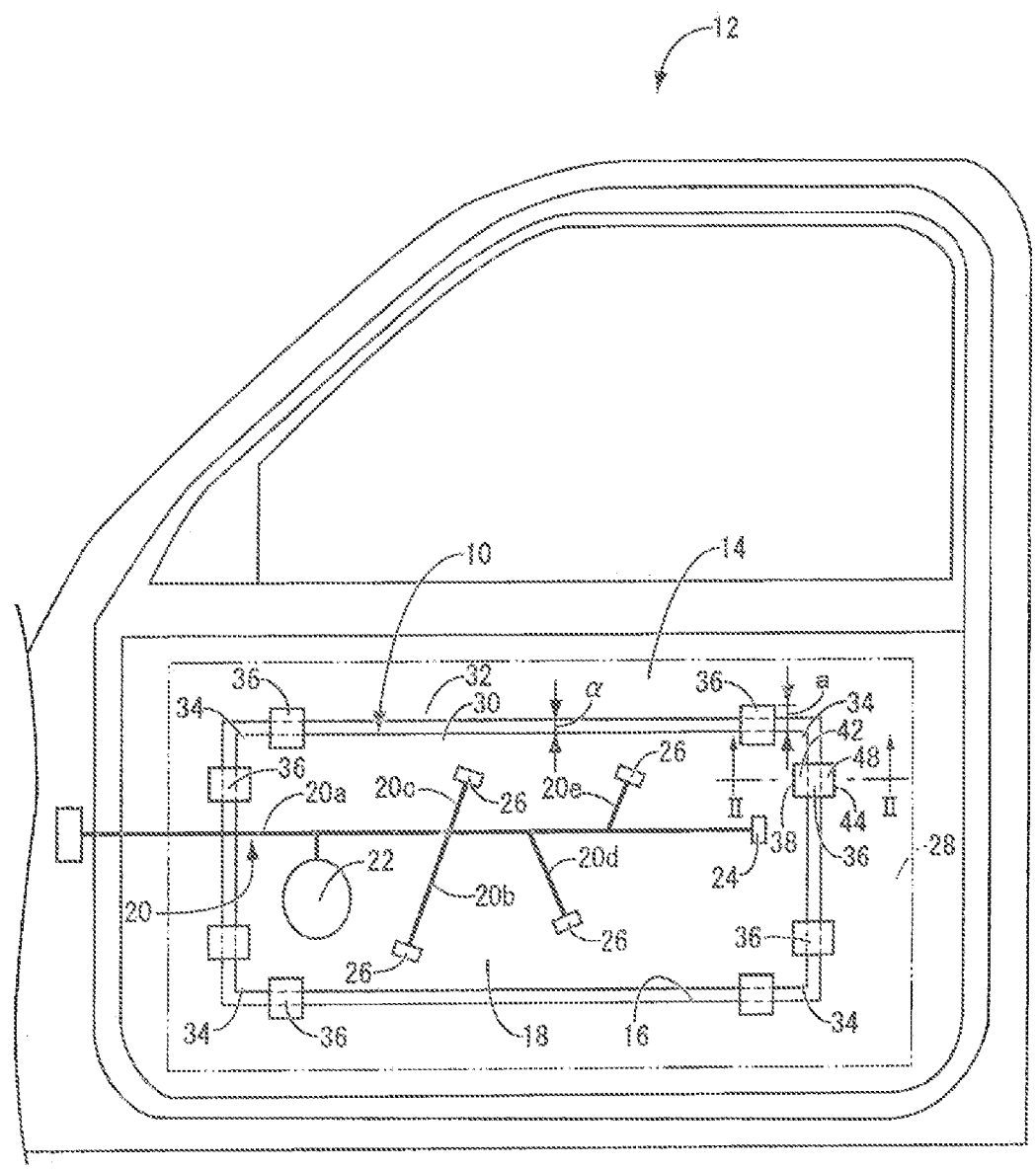
FIG. 1 is a schematic view showing an example of a structure of a door unit including a door module according to a first embodiment of the present invention.
Figure 2:
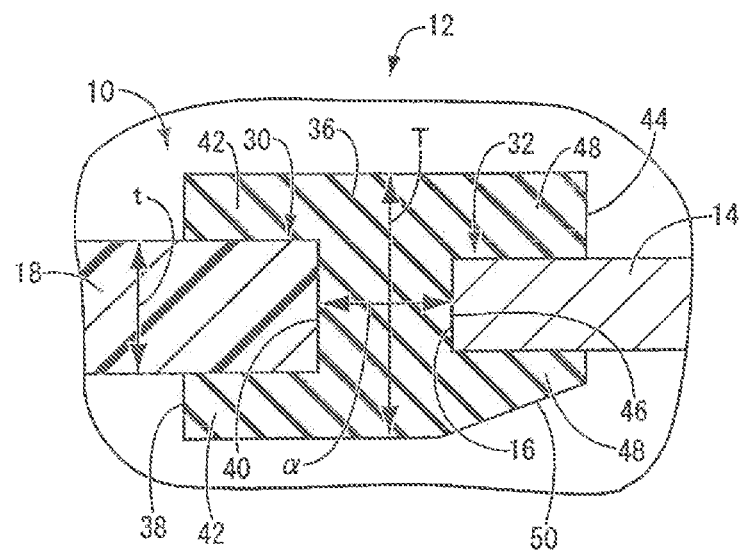
FIG. 2 is an enlarged view showing a cross section taken along line II-II in FIG. 1.
Figure 3:
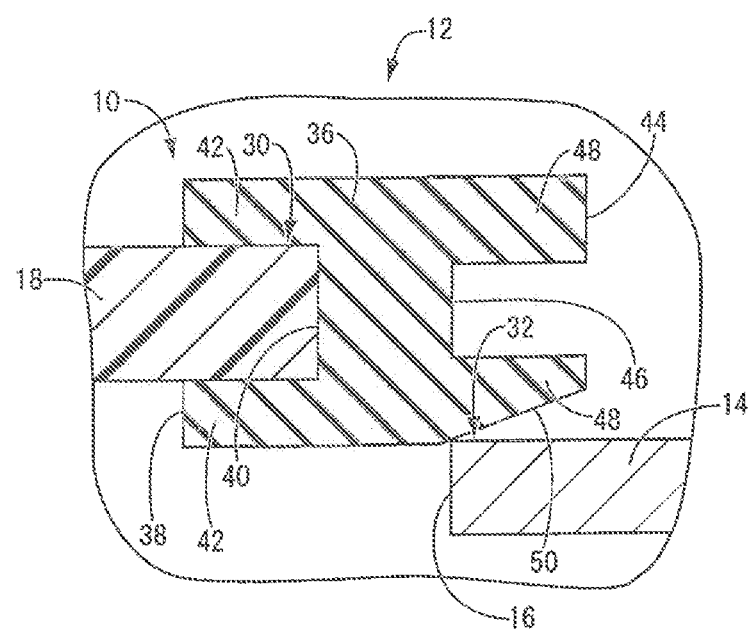
FIG. 3 is a view for explaining a procedure of fitting a closing plate into a service hole, and corresponds to a cross section taken along in FIG. 1.
Figure 4:
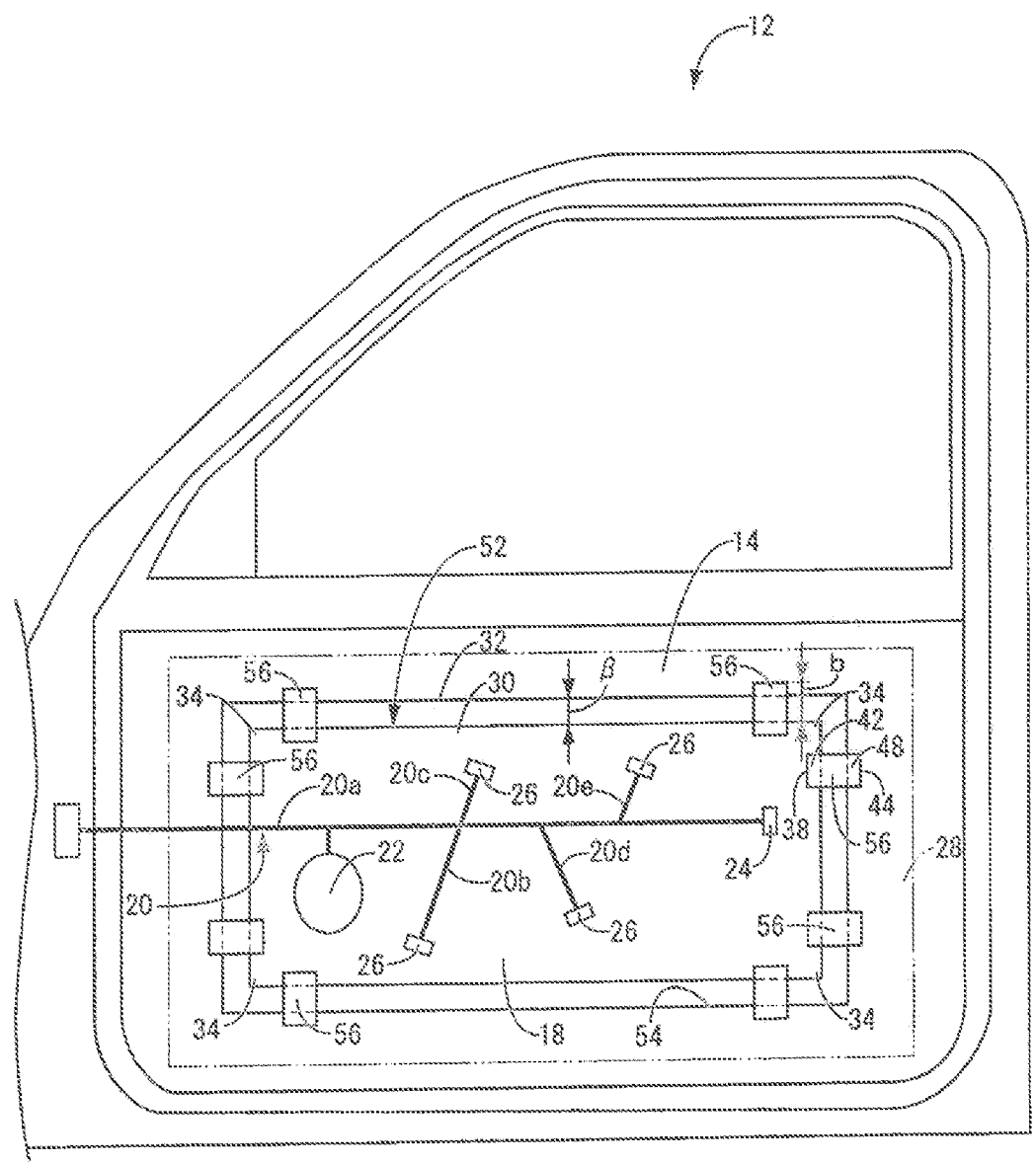
FIG. 4 is a schematic view showing an example of a structure of a door unit including a door module according to another aspect of the first embodiment of the present invention.
Figure 5:
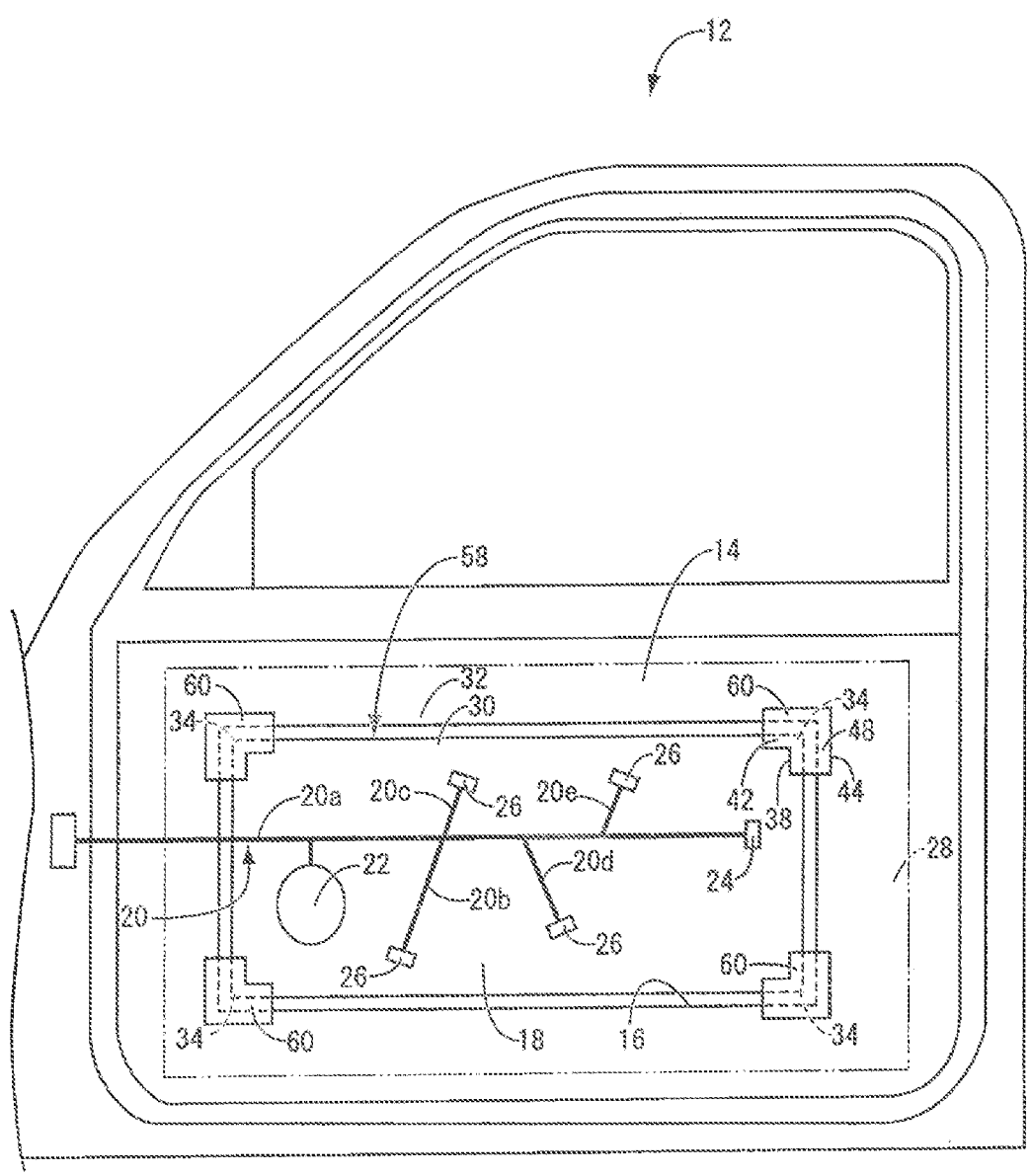
FIG. 5 is a schematic view showing an example of a structure of a door unit including a door module according to a second embodiment of the present invention.
Figure 6:
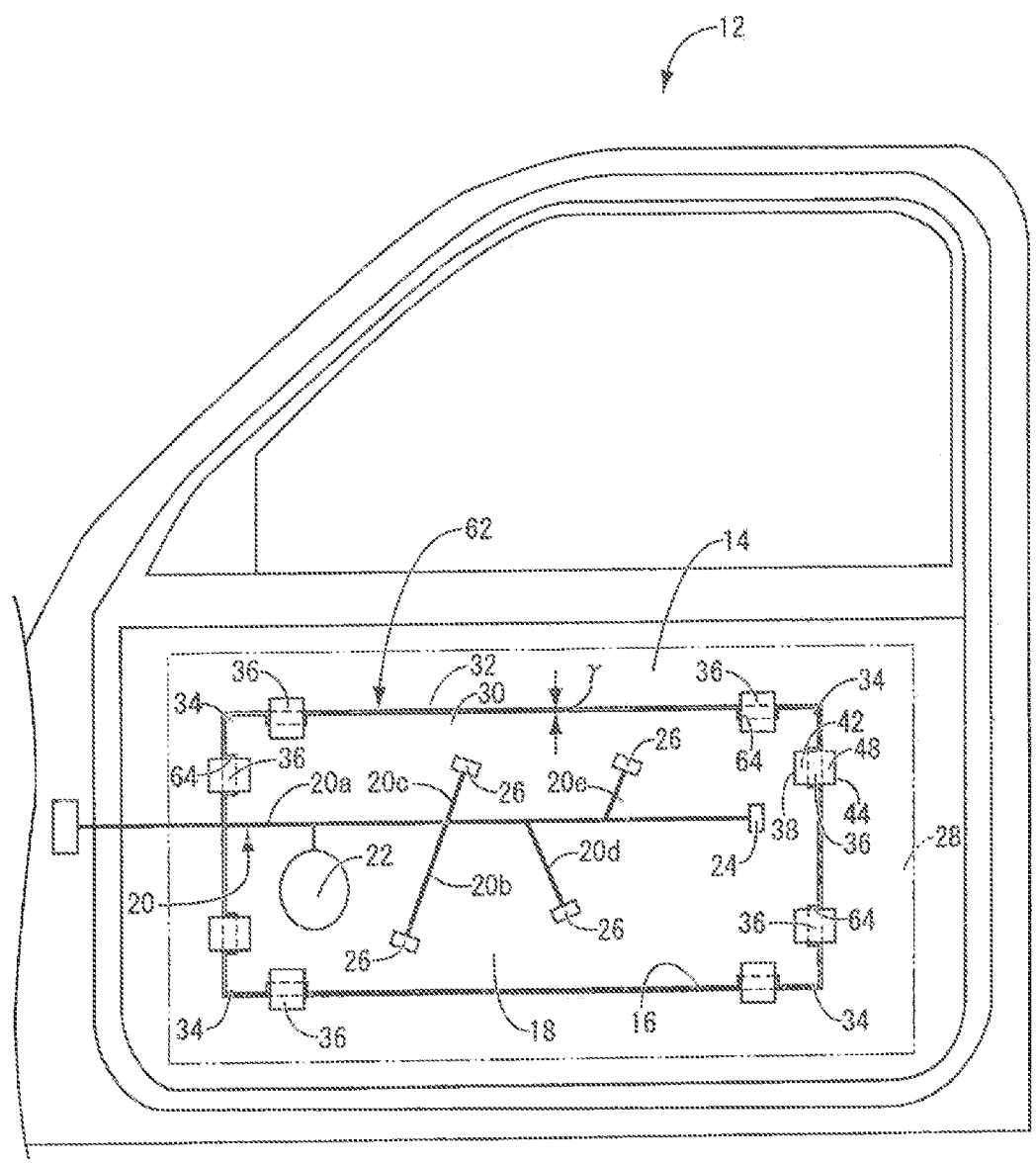
FIG. 6 is a schematic view showing an example of a structure of a door unit including a door module according to a third embodiment of the present invention.

FIGS. 1 to 3 show a door unit 12 including a door module 10 according to a first embodiment of the present invention. As shown in FIG. 1, a door inner panel 14 that constitutes the indoor side (the near side in FIG. 1) of the door unit 12 of an automobile is provided with a service hole 16 having a substantially rectangular cross-sectional shape that opens toward the indoor side. The service hole 16 is provided so that fingers, tools, components, or the like can be inserted into the door unit 12 when maintenance is performed, and is closed by a resin closing plate 18 so that water or the like does not enter the indoor side from the service hole 16. In the following description, "upper side" refers to the upper side in FIG. 1, "lower side" refers to the lower side in FIG. 1, "front side" refers to the left side in FIG. 1, and "rear side" refers to the right side in FIG. 1. Further, "near side" refers to the upper side in the direction perpendicular to the paper plane of FIG. 1, and "far side" refers to the lower side in the direction perpendicular to the paper plane of FIG. 1.

A door harness 20 is routed in advance on the closing plate 18 to constitute the door module 10. More specifically, as shown in FIG. 1, the door module 10 is configured by previously assembling the door harness 20, a speaker 22, a power window motor, a remote controlled mirror motor (not shown), and the like on the closing plate 18. The door harness 20 routed on the closing plate 18 has one end of a trunk line 20a connected to a wire harness on the vehicle body panel side (not shown) located in front (the left side in FIG. 1) of the door unit 12. Also, in the door harness 20, a centralized connector 24 that is connected to various auxiliary devices (not shown) provided on the door inner panel 14 side is connected to the other terminal of the trunk line 20a. Further, a plurality of branch lines 20b to 20e are branched in the vertical and oblique directions from the trunk line 20a, and connectors 26 provided at terminals of the branch lines 20b to 20e are respectively connected to the above-mentioned power window motor, the remote controlled mirror motor, and the like. Note, that the door harness 20 is fixed to the closing plate 18 in a wire harness assembling step, using band clamps (not shown), for example. The service hole 16 is closed by the closing plate 18 on which the door harness 20 is routed in advance, while the closing plate 18 is covered by a substantially rectangular flat door trim 28 from the indoor side (the near side in FIG. 1). For ease of understanding, the door trim 28 is shown in phantom lines in FIG. 1 and FIGS. 4 to 6.

As shown in FIG. 1, the closing plate 18 is formed in such a size that its outer circumferential edge 30 faces the inner circumferential edge 32 of the service hole 16 with a substantially constant gap α therebetween, and has a substantially rectangular flat plate shape as a whole. In the vicinity of the four corners 34 of the outer circumferential edge 30 of the closing plate 18 having a substantially flat plate shape, a total of eight elastic fitting portions 36 are provided at positions facing the inner circumferential edge 32 of the service hole 16 in the longitudinal direction (in the left and right direction in FIG. 1) and at positions facing the inner circumferential edge 32 of the service hole 16 in the width direction (in the up and down direction in FIG. 1). In other words, the elastic fitting portions 36 are provided at eight locations spaced apart in the circumferential direction of the outer circumferential edge 30 of the closing plate 18. The elastic fitting portions 36 are formed separately from the closing plate 18, and are formed of a rubber elastic body integrally formed of a rubber material such as EPDM (ethylene propylene rubber).

More specifically, as shown in FIGS. 1 and 2, each elastic fitting portion 36 has a substantially rectangular block shape. On a base end surface 38 on the base end side (the left side in FIG. 2) of the elastic fitting portion 36, an outer circumferential edge accommodating recessed groove 40 is provided that opens at the center in the thickness direction (up and down direction in FIG. 2) of the base end surface 38, extends in the circumferential direction (the direction perpendicular to the paper plane in FIG. 2) with a substantially rectangular cross-sectional shape, and opens in the circumferential direction. The outer circumferential edge accommodating recessed groove 40 is attached to the closing plate 18 to accommodate its outer circumferential edge 30, and the outer circumferential edge 30 of the closing plate 18 is held between a pair of holding pieces 42 facing each other with the outer circumferential edge accommodating recessed groove 40 interposed between the pair of holding pieces 42. In other words, the pair of holding pieces 42 are pressed against the outer circumferential edge 30 of the closing plate 13 by an elastic restoring force. The pair of holding pieces 42 may also be brought; into contact with the outer circumferential edge 30 of the closing plate 18 without being pressed, and fixed with an adhesive or the like. In this case, the elastic fitting portion 36 can be attached to the closing plate 18 without requiring a large force.

On the other hand, on a protruding end surface 44 on the distal end side (the right side in FIG. 2) of the elastic fitting portion 36, an inner circumferential edge accommodating recessed groove 46 is provided that opens at the center in the thickness direction (up and down direction in FIG. 2) of the protruding end surface 44, extends in the circumferential direction (the direction perpendicular to the paper plane in FIG. 2) with a substantially rectangular cross-sectional shape, and opens in the circumferential direction. The inner circumferential edge accommodating recessed groove 46 is attached to accommodate the inner circumferential edge 32 of the service hole 16, and the inner circumferential edge 32 of the service hole 16 is clamped between a pair of elastic clamping pieces 48 facing each other with the inner circumferential edge accommodating recessed groove 46 interposed between the pair of elastic clamping pieces 48. On the lower surface of the elastic clamping piece 48 located below the inner circumferential edge accommodating recessed groove 46, a tapered surface 50 is provided that is inclined toward the inner circumferential edge accommodating recessed groove 46 toward the protruding end surface 44. As a result, the elastic fitting portions 36 attached to the outer circumferential edge 30 of the closing plate 18 protrude to the outer side of the inner circumferential edge 32 of the service hole 16 and are fitted to the inner circumferential edge 32, and the elastic fitting portions 36 are projectingly provided to extend in the circumferential direction of the outer circumferential edge 30 of the closing plate 18 with a thickness T larger than the plate thickness t of the closing plate 18.

Next, a procedure for fixing the door module 10 in which the door harness 20 is routed in advance on the closing plate 18 to the inner circumferential edge 32 of the service hole 16 provided in the door inner panel 14 using the elastic fitting portions 36 serving as the door module fixtures will be briefly described with reference to FIGS. 2 and 3. First, the door module 10 in which the elastic fitting portions 36 are attached to the closing plate 18 is prepared. After disposing the door module 10 at a position facing the service hole 16 of the door inner panel 14, the lower surface of the elastic clamping piece 48 of each elastic fitting portion 36 is brought into contact with the inner circumferential edge 32 of the service hole 16 (see FIG. 3). By pushing the door module 10 toward the door inner panel 14 from this state, the elastic clamping piece 48 having the tapered surface 50 is elastically deformed in a direction away from the door inner panel 14, so that the inner circumferential edge 32 of the service hole 16 is allowed to be inserted into the inner circumferential edge accommodating recessed groove 46. Here, because the elastic clamping piece 48 having the tapered surface 50 is thinner than the other elastic clamping piece 48, elastic deformation can be easily performed. By further pushing, the inner circumferential edge 32 of the service hole 16 is inserted into the inner circumferential edge accommodating recessed groove 46, and the elastic clamping piece 48 is elastically restored to clamp the inner circumferential edge 32 of the service hole 16 between the pair of elastic clamping pieces 48 (see FIG. 2). As a result, the door module 10 is fitted via the elastic fitting portion 36 to the inner circumferential edge 32 of the service hole 16 provided in the door inner panel 14, and the door module 10 is held by the door inner panel 14.

According to the door module 10 of the present embodiment having such a structure, by simply applying a pushing force after placing the door module 10 in which the door harness 20 is routed in advance on the closing plate 18 on the service hole 16 of the door inner panel 14, the inner circumferential edge 32 of the service hole 16 is inserted into the inner circumferential edge accommodating recessed groove 46 of the elastic fitting portion 36, and the inner circumferential edge 32 can be clamped between the pair of elastic clamping pieces 48. In this manner, the door module 10 can be held by the door inner panel 14. Accordingly, the conventionally required work of bolt fastening the door module to the door inner panel can be omitted, and a large device required for bolt fastening can be eliminated. Further, the work of assembling the door module 10 to the door inner panel 14 can be simplified, and the automation of the assembling process can be further advantageously promoted. Moreover, because the door module 10 is fixed to the door inner panel 14 by clamping the inner circumferential edge 32 of the service hole 16 between the pair of elastic clamping pieces 48, a contact surface between the door module 10 and the door inner panel 14 can be eliminated. Therefore, the rubber packing required for the conventional bolt fastening structure can be eliminated, and the number of components can be reduced.

In addition, because the elastic fitting portions 36 are formed separately from the closing plate 18, the elastic fitting portions 36 can be easily manufactured. Moreover, by simply fitting the outer circumferential edge accommodating recessed groove 40 provided on the base end side of the elastic fitting portion 36 to the outer circumferential edge 30 of the closing plate 18, the elastic fitting portion 36 can be easily attached to the closing plate 18 while being held between the pair of holding pieces 42. Furthermore, because the elastic fitting portions 36 are provided at a plurality of locations (eight locations in the present embodiment) spaced apart in the circumferential direction of the closing plate 18, the pressing force applied when attaching the door module 10 to the service hole 16 can be reduced, and the attachment can be easily performed. Note, that the attachment locations of the elastic fitting portions 36 to the closing plate 18 can be set to include, for example, a location that conventionally needs to be bolted and fixed. Further, because the elastic fitting portions 36 are formed of a rubber elastic body, the door module 10 can be fixed, to the door inner panel 14 while ensuring high vibration damping characteristics. Moreover, because a large amount of elastic deformation of the pair of elastic clamping pieces 48 can be ensured, the clamping force of the pair of elastic clamping pieces 48 can be advantageously obtained.

Although the embodiment of the present invention has been described in detail, the present invention is not limited by these specific descriptions. In the first embodiment, for example, although the outer circumferential edge 30 of the closing plate 18 is formed in a size facing the inner circumferential edge 32 of the service hole 10 with a substantially constant gap $\alpha$ therebetween, as a door module 52 as another aspect of the first embodiment of the present invention shown in FIG. 4, the outer circumferential edge 30 of the closing plate 18 may also be formed to have a size facing an inner circumferential edge 32 of a service hole 54 with a substantially constant gap $\beta$. In this case, the closing plate 18 can be used for a plurality of vehicle types (two types in the present embodiment) having different sizes of the service holes 16 and 54. That is to say, the elastic fitting portions 36 and 56 corresponding to the plurality of vehicle types are prepared, and the elastic fitting portions 36 and 56 corresponding to the plurality of vehicle types are selected and attached to the closing plate 18. More specifically, the protruding dimensions a and b of the elastic fitting portions 36 and 56 from the outer circumferential edge 30 of the closing plate 18 differ, according to the facing gap sizes $\alpha$ and $\beta$ between the outer circumferential edge 30 of the closing plate 18 and the inner circumferential edge 32 of the service holes 16 and 54, which differ for each of the plurality of vehicle types. In this way, even if the sizes of the service holes 16 and 54 are different in a plurality of vehicle types, by using the same size of closing plate 18 and preparing the elastic fitting portion 36 and 56 with different protruding dimensions a and b according to the difference of the vehicle type to prepare a plurality of elastic fitting portions, it is possible to cope with the differences for each vehicle type. This makes it possible to use the same size of closing plate 18, and to improve the versatility of the door modules 10 and 52 according to the present invention.

Also, in the first embodiment, the elastic fitting portions 36 and 56 have a substantially rectangular shape. However, as an elastic fitting portion 60 of a door module 58 according to a second, embodiment of the present invention shown in FIG. 5, the shape may also be substantially L-shaped. In this manner, the number of attachment locations of the elastic fitting portions 60 can be reduced by half from eight locations in case of the conventional elastic fitting portions 36 and 56 to four locations, so that the work efficiency can be improved. Further, in the first embodiment, the substantially constant gap α is formed between the outer circumferential edge 30 of the closing plate 18 and the inner circumferential edge 32 of the service hole 16. However, as a door module 62 according to a third embodiment of the present invention shown in FIG. 6, cut-out portions 64 each having a substantially rectangular cross-sectional shape and opening outward may also be provided at the attachment locations of the elastic fitting portions 36 on the outer circumferential edge 30 of the closing plate 18. In this manner, a gap γ between the outer circumferential edge 30 of the closing plate 18 and the inner circumferential edge 32 of the service hole 16 can be significantly reduced as compared with the case of the first embodiment (α).

In addition, in the first to third embodiments, the elastic fitting portions 36, 56, and 66 are provided only on a part of the outer circumferential edge 30 of the closing plate 18 in the circumferential direction. However, the elastic fitting portions 36, 56, and 60 may also be provided over the entire circumference, and may also be appropriately set according to the required waterproof property and vibration damping property. Also, in the first to third embodiments, the elastic fitting portions 36, 56, and 60 are formed separately from the closing plate 18. However, the elastic fitting portions 36, 56, and 60 may also be provided integrally by, for example, two color molding using a soft resin. Further, in the first to third embodiments, the service holes 16 and 54 and the closing plate 18 are formed in a substantially rectangular shape, but any shape can be adopted. Also, in the first embodiment, the tapered surface 50 is provided on the lower surface of the elastic clamping piece 48 located below the inner circumferential edge accommodating recessed groove 46 of the pair of elastic clamping pieces 48, but the tapered surface 50 is not necessarily required.

LIST OF REFERENCE NUMERALS 10, 52, 58, 62 Door module
14 Door inner panel
16,54 Service hole
18 Closing plate
20 Door harness
30 Outer circumferential edge
32 Inner circumferential edge
36, 50, 60 Elastic fitting portion (Door module fixture)
38 Base end surface
40 Outer circumferential edge accommodating recessed groove
42 Holding piece
44 Protruding end surface
46 Inner circumferential edge accommodating recessed groove
48 Elastic clamping piece

The invention claimed is:

1. A door module in which a door harness is routed in advance on a closing plate made of resin for closing a service hole provided in a door inner nel of an automobile,
wherein the closing plate is formed in such a size that its outer circumferential edge faces an inner circumferential edge of the service hole across a gap,
on the outer circumferential edge of the closing plate, an elastic fitting portion protruding to the outer side of the inner circumferential edge of the service hole and fitting with the inner circumferential edge projects with a thickness larger than the plate thickness of the closing plate and extends in the circumferential direction of the outer circumferential edge, and
the elastic fitting portion is provided with an inner circumferential edge accommodating recessed groove that opens in the center of a protruding end surface of the elastic fitting portion and extends in the circumferential direction to accommodate the inner circumferential edge of the service hole, and the inner circumferential edge of the service hole is clamped between a pair of elastic clamping pieces that face each other with the inner circumferential edge accommodating recessed groove interposed between the pair of elastic clamping pieces.

2. The door module according to claim 1,
wherein the elastic fitting portion is provided at a plurality of locations spaced apart in the circumferential direction of the outer circumferential edge of the closing plate.

3. The door module according to claim 1,
wherein the elastic fitting portion is formed of a rubber elastic body.

4. The door module according to claim 1,
wherein the elastic fitting portion is formed separately from the closing plate and provided with an outer circumferential edge accommodating recessed groove that opens in the center of a base end surface of the elastic fitting portion and extends in the circumferential direction to accommodate the outer circumferential edge of the closing plate, and the outer circumferential edge of the closing plate is held between a pair of holding pieces that face each other with the outer circumferential edge accommodating recessed groove interposed between the pair of holding pieces.

5. The door module according to claim 4,
wherein the closing plate can be used in a plurality of vehicle types,
a plurality of types of the elastic fitting portions are prepared, each of which has a different protruding dimension according to the difference in a facing gap size between the outer circumferential edge of the closing plate and the inner circumferential edge of the service hole, which differs for each of the plurality of vehicle types, and
the elastic fitting portion corresponding to the vehicle type is selected and attached to the closing plate.

* * * * *